(12) United States Patent
Marshall (10) Patent No.: US 6,452,691 B1
(45) Date of Patent: Sep. 17, 2002

(54) COMPUTER NETWORK-BASED FACSIMILE RECEPTION SYSTEM

(75) Inventor: Catherine R. Marshall, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/418,873

(22) Filed: Oct. 15, 1999

Related U.S. Application Data

(63) Continuation of application No. 08/015,756, filed on Feb. 10, 1993, now Pat. No. 6,396,597.

(51) Int. Cl.$^7$ .......................... G06F 13/00; H04N 1/32; G06E 15/16
(52) U.S. Cl. ...................... 358/1.15; 358/442; 709/200
(58) Field of Search .................... 358/1.15, 1.1, 358/442, 444, 403, 402, 407, 425, 434, 440, 468; 379/100.01; 709/249, 250, 200, 201, 213, 225, 227, 238, 230, 232

(56) References Cited

U.S. PATENT DOCUMENTS

| | | | |
|---|---|---|---|
| 4,907,274 A | | 3/1990 | Nomura et al. |
| 4,969,184 A | * | 11/1990 | Gordon et al. ............... 379/100 |
| 5,061,916 A | | 10/1991 | French et al. |
| 5,136,634 A | * | 8/1992 | Rae ............................. 379/100 |
| 5,170,266 A | * | 12/1992 | March et al. ................ 358/468 |
| 5,200,993 A | | 4/1993 | Wheeler et al. |
| 5,224,156 A | | 6/1993 | Fuller et al. |
| 5,227,893 A | * | 7/1993 | Ett .............................. 358/400 |
| 5,291,302 A | * | 3/1994 | Gordon et al. ............... 358/400 |
| 5,291,546 A | * | 3/1994 | Giler et al. ................... 379/100 |
| 5,299,255 A | * | 3/1994 | Iwaki et al. ................... 379/96 |
| 5,325,310 A | | 6/1994 | Johnson et al. |
| 5,384,835 A | * | 1/1995 | Wheeler et al. .............. 379/96 |

* cited by examiner

Primary Examiner—Madeleine Nguyen
(74) Attorney, Agent, or Firm—Townsend and Townsend and Crew LLP (57) ABSTRACT

A method for transmitting facsimile documents from a facsimile store-and-forward service computer (50) to a networked computer system (20). The networked computer system includes a central server computer (22) and one 11 or more computers (34) coupled to the central server computer. According to a first embodiment of the present invention, the central server computer is programmed to determine whether the facsimile store-and-forward service computer has received a facsimile document for a particular user of the networked computer system. If so, the central server causes the facsimile store-and-forward service computer to transmit the facsimile documents to the central server computer. Upon receipt, the central server computer opens a file that is associated with the particular user and stores the facsimile document in the file. According to a second embodiment of the present invention, the facsimile store-and-forward service computer is programmed to transmit any received facsimile documents to the central server computer upon receipt. The service computer inserts a code into a header block that is transmitted with the facsimile document to indicate to the central server computer who is the intended recipient of the facsimile document. After receiving the header block, the central server computer reads the code and identifies the intended recipient, opens a file associated with the intended recipient, stores the received facsimile document in the file and notifies the intended recipient that a facsimile document has been received.

18 Claims, 5 Drawing Sheets

COMPUTER NETWORK-BASED FACSIMILE RECEPTION SYSTEM

This is a continuation of copending application(s) Ser. No. 08/015,756 filed on Feb. 10, 1993.

FIELD OF THE INVENTION

The present invention relates to communication systems in general and in particular to facsimile and data communication systems.

BACKGROUND OF THE INVENTION

In the past ten years, the two devices that have probably had the greatest impact on the way modem business is conducted are the personal computer, and the facsimile (fax) machine. Facsimile machines have revolutionized the speed at which replicas of documents can be transmitted from one place to another. With a facsimile machine, copies of documents can be sent all over the world almost instantaneously, without the delay, cost, or uncertainty that accompanies sending original documents through the mail.

Similarly, personal computers have also changed the modern business environment. With a personal computer, large numbers of documents can be stored, retrieved, edited and printed with virtually the touch of a button. A facsimile-compatible modem, together with appropriate software, allows a user to combine the benefits of both computer and facsimile technology in a single machine. With a facsimile-compatible modem and software to control it, it is possible to send and receive facsimile documents to and from a computer. While facsimile-compatible modems generally work well, there are situations where it is either too costly or impractical for every computer user who wishes to have the ability to send and receive fax messages on a computer to buy a facsimile-compatible modem and the required telephone line services. One way of making computer-based faxing more affordable is to share the modem, software, and required telephone line services via a computer network.

In the past few years, networked computer systems, so-called local area networks (LANs), have become the predominant way of connecting more than one computer together. A typical LAN system includes a central server computer, and a plurality of satellite computers that are coupled to the central server computer and to each other, by electrical or fiber optic cables. Local area networks allow the plurality of satellite computers to share software programs and data as well as computer hardware such as printers, disk drives or facsimile-compatible modems.

As described above, it is possible for a networked computer system to be equipped with a single facsimile-compatible modem so that each user of the network can send and receive facsimile documents directly from their computer. Facsimile-compatible modems are typically coupled to the central server computer and have a single telephone line that connects the modem to a telephone switching network.

While it is not a problem to send facsimile documents using a facsimile-compatible modem on a local area network, there currently exists no reliable method whereby facsimile documents can be received by one user of the network without the possibility that another user may be able to read the document. Because current local area network systems have no way of determining who is the intended recipient of a facsimile document as it is being received, all received facsimile documents are handled in one of two ways. The first way in which the local area network handles received facsimile documents is to place the received documents in a common folder on the central server computer that is accessible by all users of the system. Users of the network system must open and view each received facsimile document in order to determine its intended recipient. Obviously, such a process jeopardizes the confidential nature of the information contained within the received facsimile documents. The second common way a local area network routes a received facsimile document to its intended recipient is to require the sender of the facsimile to insert a code into some recognizable part of the document (e.g., the first page). The code is read by an optical character recognition program that can decipher the code and associate it with a particular user of the network computer system who is the recipient of the document. The central server computer can then alert the recipient that a facsimile document has been received. The problem with this approach is that the sender of the facsimile must know how to insert the code into the document according to the particular protocol required by the central server computer as well as know the particular code to be inserted for the intended recipient. A second problem with this approach is that optical character recognition program is not always accurate.

Therefore, there exists a need for a system whereby facsimile documents can be received by a single facsimile-compatible modem on a networked computer system and directed to their intended recipient with high reliability and without comprising the confidentiality of the documents received.

The system should be compatible with current facsimile machines and facsimile store-and-forward services as will be further described below. The system should require no more hardware than is currently required to send and receive facsimile documents on a local area network computer system. Finally, the system should not require the sender of the facsimile to insert any additional codes into the document itself. That is to say, the system should be transparent to the sender of the facsimile.

SUMMARY OF THE INVENTION

The present invention comprises a method for transmitting facsimile documents from a facsimile store-and-forward service computer (service computer) to a networked computer system that has a facsimile-compatible (fax) modem asociated with one computer on the network. For the purposes of the present specification, the computer having the fax modem associated with it shall be designated as the central server computer. The facsimile-compatible modem is coupled to the central server computer for transmitting facsimile documents to another facsimile machine or to a store-and-forward service computer and for receiving facsimile documents from a store-and-forward service computer in which the facsimile documents have been previously stored. Software on the central server computer causes the facsimile-compatible modem to dial a telephone number to connect the networked computer system to a remote facsimile store-and-forward service computer. Next, the central server computer causes the modem to transmit a series of codes to the service computer that 1) specify the identification of a particular user known to the store-and-forward service computer, if such identification is required (Note: In cases in which the facsimile store-and-forward service provides a unique telephone number for each user, this step is not required), 2) provide a security code associated with the particular user, and 3) indicate that the facsimile-compatible modem wishes to receive facsimile documents stored in the service computer that are to be directed to the particular user. The service computer then transmits any facsimile documents that are to be directed to the particular user to the facsimile-compatible modem. Upon receiving the facsimile documents, the central server computer opens a file that is associated with the particular user and stores the received facsimile documents in the file. Finally, the central server computer alerts the particular user of the networked computer system that a facsimile document has been received. Preferably, the central server computer periodically performs the above-referenced steps for each user of the networked computer system.

According to a second aspect of the present invention, the store-and-forward service computer is programmed to send any received facsimile documents to the central server computer for the particular networked computer system on which the intended recipient is located. When the service computer receives a facsimile document, the service computer reads a record of user profile data that is associated with the intended recipient. If the user profile data indicates the received facsimile document is to be transmitted to a networked computer systems the service computer reads a telephone number for a facsimile-compatible modem coupled to the networked computer system. The service computer then inserts a unique code assigned to the recipient into a header block. The service computer then dials the number of the facsimile-compatible modem and transmits both the header block and the facsimile document to the facsimile-compatible modem. The central server computer on the networked computer system reads the header block to determine who is the intended recipient of the facsimile document. The central server computer then stores the received facsimile document in a file or folder associated with the intended recipient and alerts the intended recipient that a facsimile document has been received.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
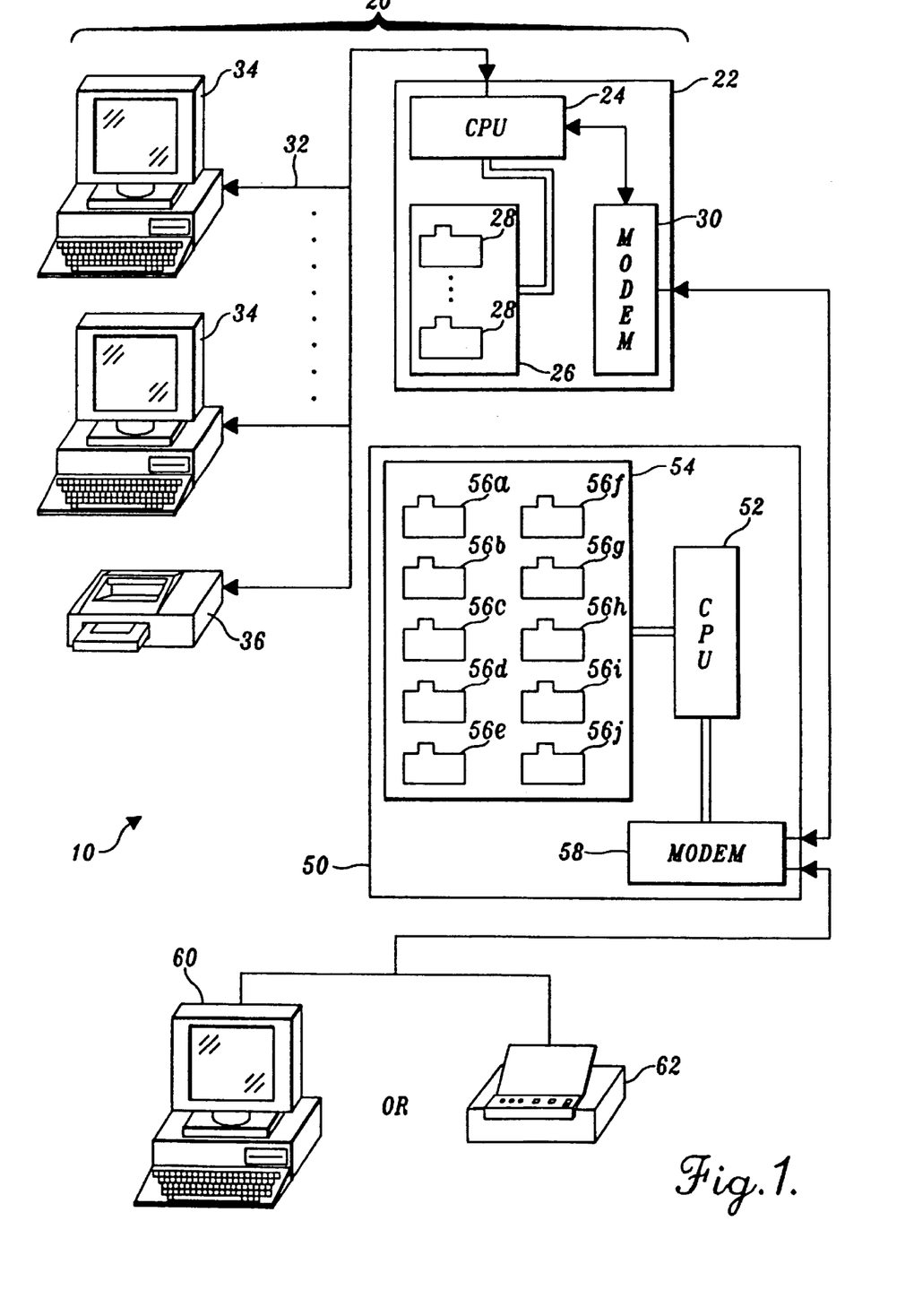
FIG. 1 is a block diagram of a facsimile communication system according to the present invention.

FIG. 1 is a block diagram of a facsimile transmission system according to the present invention. The system 10 includes a networked computer system 20, a facsimile store-and-forward service computer 50 and one or more remote computers 60 or facsimile machines 62.

The networked computer system 20 includes a central server computer 22 and a plurality of satellite computers 34, which are linked to the central server computer by electrical or fiber optic cables 32. The central server computer 22 comprises a central processing unit 24, a memory unit 26 that contains a series of folders or files 28 and a facsimile-compatible modem 30. Other peripheral devices may also be included on the networked computer system 20 such as a printer 36. The details of the networked computer system 20 and the central server computer 22 are well known to those of ordinary skill in the computer arts.

Although the present invention is described as being used on a networked computer system, it can also be used on a system that includes just one computer shared by multiple users who each wish to send and receive confidential fax messages via the fax modem. In this case, we would not have a "networked" computer system, strictly speaking, but the method of the invention would still apply.

The store-and-forward service computer 50 (service computer) is a multi-purpose computer system that is typically operated by a communications company. The service computer 50 includes a central processing unit 52, a memory unit 54 that contains a series of files or folders 56 and a facsimile-compatible modem (or modem bank) 58. In the present invention, the service computer 50 is operated by a communications company that provides a facsimile store-and-forward service to customers. For example, the present invention is designed to work with the FAXMAIL™ service that is provided by U S WEST Enhanced Services. However, as will be described below, the present invention could easily be adapted to work with similar facsimile store-and-forward services provided by other service providers.

The FAXMAIL™ service computer 50 receives and stores facsimile documents in a file until such time as the service subscriber wishes to download the documents to either a computer equipped with a facsimile-compatible modem and software or standard facsimile machine. Each user of the FAXMAIL™ service has a unique facsimile telephone number and an associated file or folder in the service computers memory unit. Facsimile documents sent to the user's unique facsimile number are stored in the associated file or folder. The facsimile-compatible modem 58 included within the service computer 50 is designed to receiver telephone calls on numerous unique facsimile numbers that are associated with each user of the FAXMAIL™ system. People sending facsimile documents to the service subscriber need not be aware that the documents are being sent to the service computer 50 rather than a standard facsimile machine.

Before the present invention, a user of the FAXMAIL™ system would have to manually call the service computer and listen to a menu. By pressing the appropriate keys on a DTMF (touch tone) telephone, the user can retrieve any facsimile documents that have been received by the service computer. The facsimile documents can be transmitted to either a personal computer that is equipped with a facsimile-compatible modem, or standard facsimile machine.

As described above, the present invention is a method for transmitting a facsimile document from the service computer 50 to a facsimile-compatible modem coupled to the networked computer system and placing the facsimile document into an intended recipient's file 28 so that the recipient can be notified that a facsimile document has been received and no one but the intended recipient can view the contents of that document.

Figure 2:
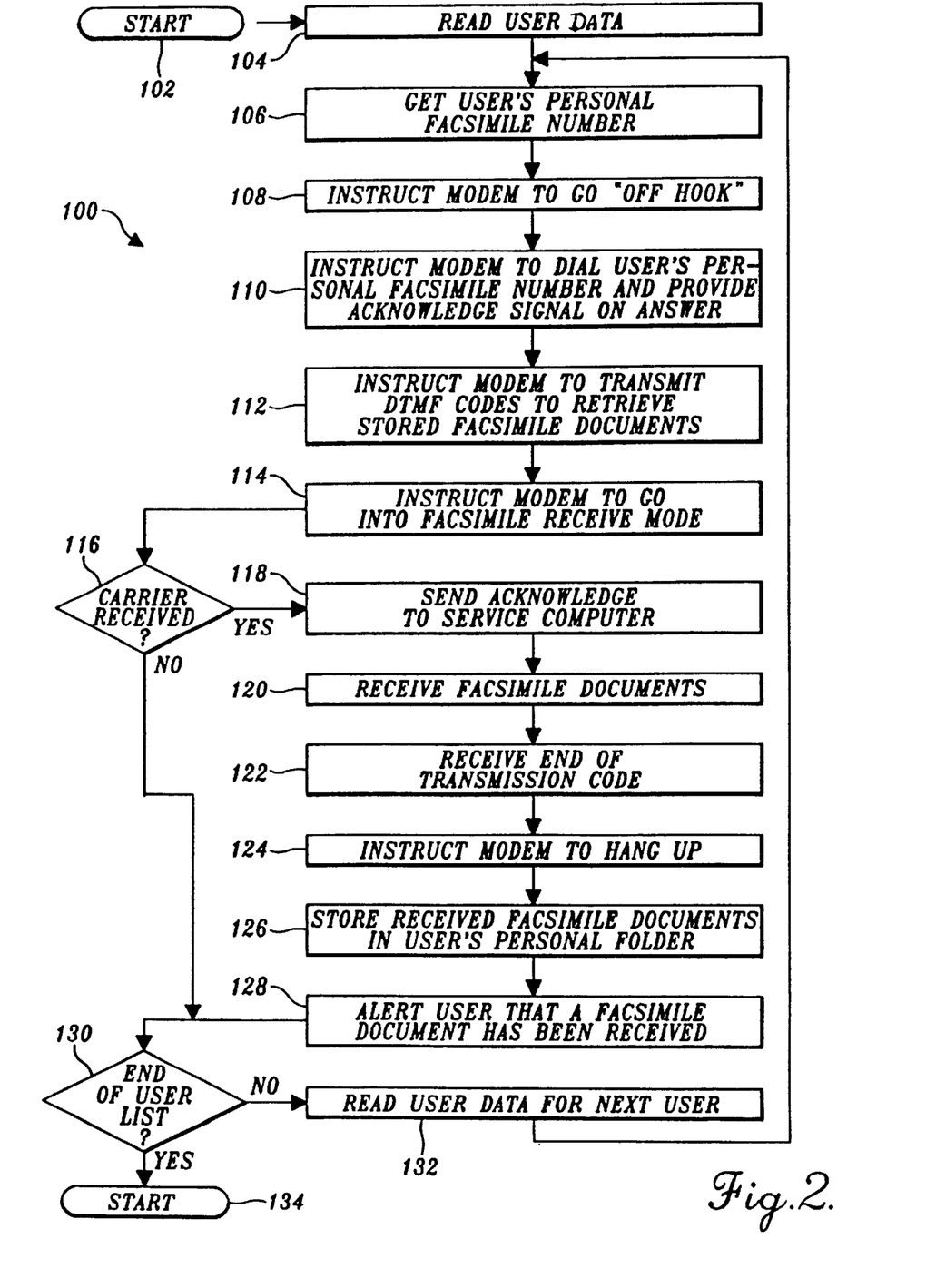
FIG. 2 is a flow chart showing a series of steps performed by a computer program that allows a central server computer to receive facsimile transmissions on a networked computer system, according to a first aspect of the present invention.

FIG. 2 is a flow chart showing a series of steps performed by a computer program that allow the central server computer 22 (shown in FIG. 1) to retrieve facsimile documents that have been previously stored in the service computer 50 for a particular user of the networked computer system. The program calls the service computer using each user's personal facsimile telephone number. If the user has received a facsimile document, the program causes the service computer to download the document into a user's personal file. If the user has not received any facsimile documents, the program proceeds to the next user and repeats the process.

The program 100 starts at a step 102 and causes CPU 24 to read at a step 104 a record containing data regarding a first user from a list of users of the networked computer system who are to have their facsimile documents automatically retrieved from the store-and-forward service computer 50. The user data includes that particular user's name or identification code on the network 20, the user's facsimile telephone number (the telephone number used by others to send facsimile documents to the user and used by the user to receive facsimile documents from the service computer 50) and the address of the user's personal file or folder in the memory 26 where the received facsimile documents are to be placed. After reading the user data, the central server computer recalls the user's facsimile telephone number at a step 106 and instructs the facsimile-compatible modem 30 to go "off hook" and obtain a dial tone at a step 108. Next, the central server computer causes the modem 30 to dial a first code that comprises the user's facsimile telephone number and to provide an acknowledge signal to the server computer when the modem 58 coupled to the service computer has answered at a step 110. It should be noted that some facsimile store-and-forward systems do not have a unique facsimile telephone number associated with each individual user. Rather, all users of the system have the same facsimile telephone number and require that a unique identification number must be transmitted to the service computer to indicate who is the intended recipient of the facsimile document. If the present invention is to be used with such a system, the central server computer includes the unique identification number and possibly a password as part of the first code transmitted at step 110. Therefore, for the purposes of the present specification, the term "code" can mean any combination of telephone numbers and/or digits.

After the first code has been transmitted, the central server computer instructs the facsimile-compatible modem 30 to transmit a series of DTMF code's to the facsimile-compatible modem 58 at a step 112. The DTMF touch-tone codes indicate to the service computer that any facsimile documents that have been received by the service computer on the telephone number dialed at step 110 are to be transmitted to the central server computer. In the preferred embodiment of the present invention that is designed to be compatible with U S WEST's FAXMAIL™ system, the DTMF touch-tone codes transmitted at step 112 are the same touch-tone codes as would be generated by pressing a telephone keypad to generate a "#" sign, followed by a 4- to 10-digit security code (e.g., "12345"), followed by a "#" sign, followed by the digits "11." After step 112, the central server computer instructs the facsimile-compatible modem 30 to go into a "facsimile mode" at step 114, thereby allowing the modem 30 to send and receive facsimile transmissions as opposed to sending and receiving standard data or telephone transmissions.

At a step 116, the central server computer 22 determines if the service computer 50 is transmitting a facsimile carrier signal upon which digital facsimile data signals can be transmitted. This can be done by having the modem 30 send a signal to the CPU 24 when carrier has been detected. Because the service computer 50 only transmits a facsimile carrier signal if a facsimile document has been received, the central server computer can determine by detecting the facsimile carrier signal that the service computer has received a facsimile document that is to be directed to the user whose telephone number was dialed in step 110. If no facsimile carrier signal is received after a reasonable period (e.g., 10 seconds), the central server computer determines that the service computer has not received a facsimile document for the user and the program jumps ahead to a step 130.

Assuming the facsimile carrier signal is received, the central server computer transmits an acknowledge signal back to the service computer 50 that indicates the carrier signal has been received at a step 118. The central server computer then receives the facsimile documents transmitted from the service computer at a step 120. Next, the central server computer looks for an end-of-transmission (EOT) code to be transmitted from the service computer at a step 122. The EOT signal is sent by the modem 58 to the central server's modem 30. Upon receipt of the EOT signal, the central server computer's modem 30 would then send a message to the CPU 24 that an EOT has been received. The end-of-transmission code indicates that the service computer has finished transmitting facsimile data. After the end-of-transmission code has been received, the central server computer instructs the facsimile-compatible modem 30 to hang up at a step 124.

Once the central server computer has received the facsimile documents, they are stored in a new file that is created in the recipient's personal folder at a step 126. Then, the central server computer alerts the recipient by sending an electronic message over the computer network to indicate that a facsimile document has been received at a step 128. Upon seeing the message that a document has been received, the recipient opens the new file that has been created in his or her personal folder in order to read the facsimile document.

After alerting the recipient that a facsimile document has been received, the central server computer determines at step 130 if there are additional users of the networked computer system in the list to be processed for automatic facsimile retrieval according to the above-described method. If there are no users left in the list, the program ends at a step 134. If there are users of the networked computer system 20 for whom the central server computer has not checked to see if the service computer has received any facsimile documents, the central server computer reads the user data for the next user at a step 132 and the above-described method begins the process again by looping back to step 106. Preferably, the central server computer would execute the above-described method periodically (e.g., once an hour) to see if each user of the networked computer system has received a facsimile. The main disadvantage of this method would be that a user may have to wait until the central server computer executes the program 100 before being able to read the contents of a received facsimile document at the satellite computer 34. A secondary disadvantage is that the method uses computing and communications resources on a scheduled basis, even when no fax messages have been received by the service computer.

In contrast to the above-described method wherein the central server computer is programmed to call the service computer to determine if facsimile documents have been received for particular users on the network, a second embodiment of the present invention involves programming the service computer to transmit received facsimile documents to the central server computer immediately upon receipt by the service computer. This method has the advantage of alerting a recipient that a facsimile document has been received within a short period of time after the service computer receives the facsimile document. It also makes use of resources only when a fax message has actually been received.

Figure 3A:
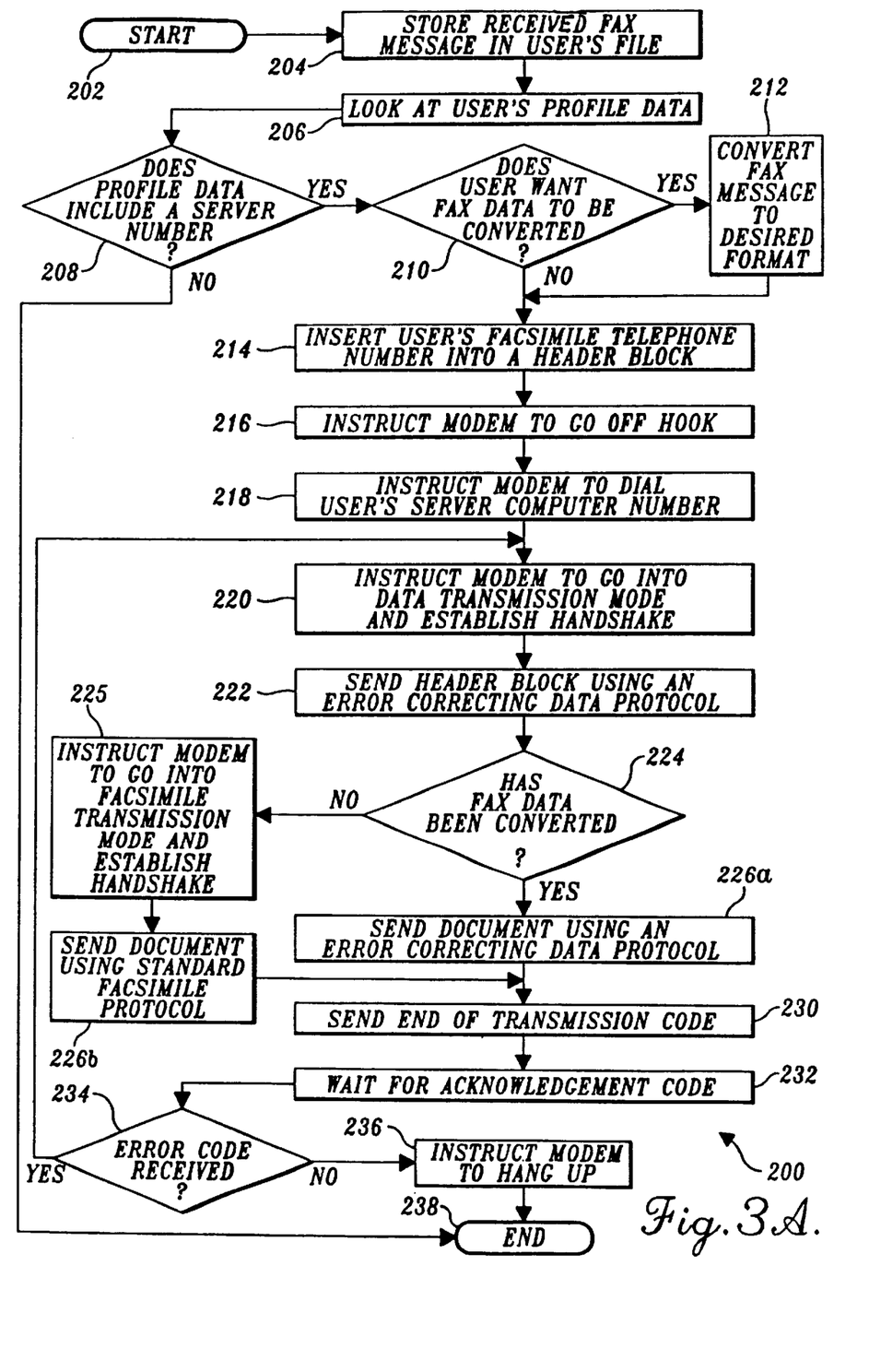
FIG. 3A is a flow chart showing a series of steps performed by a computer program that allows a facsimile store-and-forward service computer to send facsimile transmissions to a networked computer system according to a second aspect of the present invention.

FIG. 3A is a flow chart of a computer program 200 stored in memory 54 that causes the service computer 50 to send facsimile documents to the central server computer upon receipt. The program 200 begins at a step 202 and proceeds to a step 204, wherein a received facsimile document is stored in the intended recipient's file (so-called fax mailbox) 56 as shown in FIG. 1 according to the normal operating procedure of the facsimile store-and-forward service. The program then proceeds to a step 206 wherein the service computer reads a record stored in the memory unit 54 that contains user profile data for the recipient of the received facsimile document. The user profile data indicates whether the recipient desires to have the received facsimile document sent automatically from the service computer to a networked computer system equipped with appropriate hardware and software. At a step 208, the service computer determines if the user profile data includes a telephone number for a facsimile-compatible modem 30 coupled to a central server computer. If the user profile data does not include such a telephone number, then the program ends at a step 230. For example, there may be some users of the facsimile store-and-forward service who do not wish to have facsimile documents sent to a networked computer system. Assuming the user profile data does include the telephone number for a facsimile-compatible modem 30 that is part of a networked computer system, the program proceeds to a step 210.

At step 210, the program determines if the recipient wishes to receive the facsimile document in a format other than the standard group 3 CCITT facsimile data format. If so, the program proceeds to a step 212, wherein the service computer manipulates the facsimile data to the desired format. For example, it is possible to use an optical character recognition program to convert the facsimile data back into ASCII characters. Similarly, it is also possible using other conversion programs to convert the facsimile data into other types of graphics formats such as a MACPAINT®-type graphics format. The benefit of having the service computer perform these conversions is that the cost of the software to perform the conversions is borne by the company that provides the facsimile reception service, which in turn is divided among all users of the service, including users located on different local area networks, instead of requiring each user to have their own copy of the conversion program. Additionally, the software can be easily upgraded if newer, faster versions become available. If the user does not wish to convert the facsimile document to another format, the program proceeds to a step 214.

Figure 4:
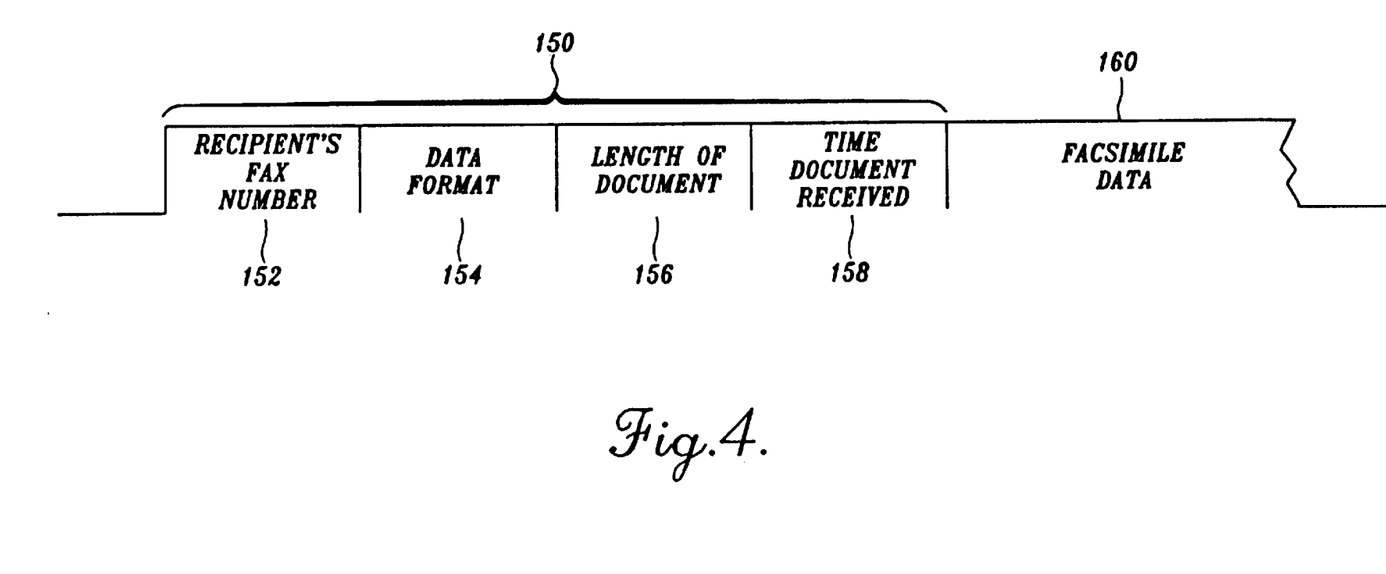
FIG. 4 is a diagram of a header block that is transmitted from the facsimile store-and-forward service computer to the central server computer according to the second aspect of the present invention.

Before the facsimile document can be transmitted from the service computer to the central server computer, some indication must be provided to indicate to the server computer who is the intended recipient of the facsimile document. The present invention accomplishes this by inserting a code into a header block that preferably precedes the facsimile data. This code, which in the preferred embodiment is the recipient's unique facsimile number, is inserted into a header block that precedes the facsimile data at the step 214. A diagram of a header block 150 is shown in FIG. 4. The header block includes a plurality of codes or segments that are read by the central server computer. The header block includes a segment 152 that contains the facsimile telephone number of the intended recipient of a facsimile document. A segment 154 contains a binary code that indicates to the server computer the format of the document to be transmitted. The header block 150 may also contain other segments such as a segment 156 that contains a code to indicate the length of the document to be transmitted and a segment 158 that contains a code that indicates the time the document was received by the service computer. As will be appreciated by those skilled in the art, the format of the header block may be changed to meet the needs of the particular system in which the present invention is to be used.

As described, the header block contains a code that is recognized by the central server computer to indicate whether the document to be sent from the service computer to the central server is in facsimile format or some other data format. The information in the header block is read by the central server to determine in what format the document to be received should be stored and to what user it should be routed. After producing the header block, the service computer instructs its facsimile compatible modem 58 to go "off-hook" at a step 216. Next, the program proceeds to a step 218, wherein the service computer instructs its modem 58 to dial the telephone number for the facsimile-compatible modem 30 coupled to the central server computer on the networked computer system.

At step 220, the service computer instructs its modem to go into a data transmission mode and establish a handshake with the central server computer. In conjunction with this step, the central server computer must recognize that the call originates from a facsimile store-and-forward service. If the telephone transmission line and modem are equipped to make use of advanced telephone signaling capabilities, this recognition can occur before the incoming call is answered. However, such recognition can also be achieved after the incoming call is answered by having the service computer send a code that identifies the data transmission to follow as originating from a facsimile store-and-forward service. Once the service computer has established (through the receipt of appropriate acknowledgment signals) that its identity has been recognized and that the central server computer is ready to receive data, it sends the header block at a step 222. Next, the service computer recalls from step 212 whether the facsimile document to be transmitted has been converted to a data format. If so, the document is transmitted at a step 226a over the already established data channel. If the document is to be transmitted in facsimile format, the service computer instructs its modem to go into facsimile transmission mode and through the sending and receiving of carrier and acknowledgment signals (handshaking), establish that the central server computer is ready to receive a facsimile transmission at a step 225. Following step 225, the service computer transmits the document in facsimile format. After the transmission is complete, the service computer transmits an end-of-transmission code at a step 230.

After sending the end-of-transmission code, the service computer waits a predetermined amount of time, at a step 232, to see if the central server, computer causes its modem 30 to transmit an acknowledgment code back to the service computer to indicate the end-of-transmission code was received by the central server computer. The program then determines if the server computer has sent an error code at a step 234, meaning the facsimile documents were not received correctly. If an error code is received, the program loops back to step 220 and the header block and facsimile data are retransmitted. If no error code is received, the service computer instructs its modem 58 to hang up at a step 236. If no acknowledgment code is received within the specified wait period, an error processing routine will be invoked. Finally, the program ends at a step 238.

Figure 3B:
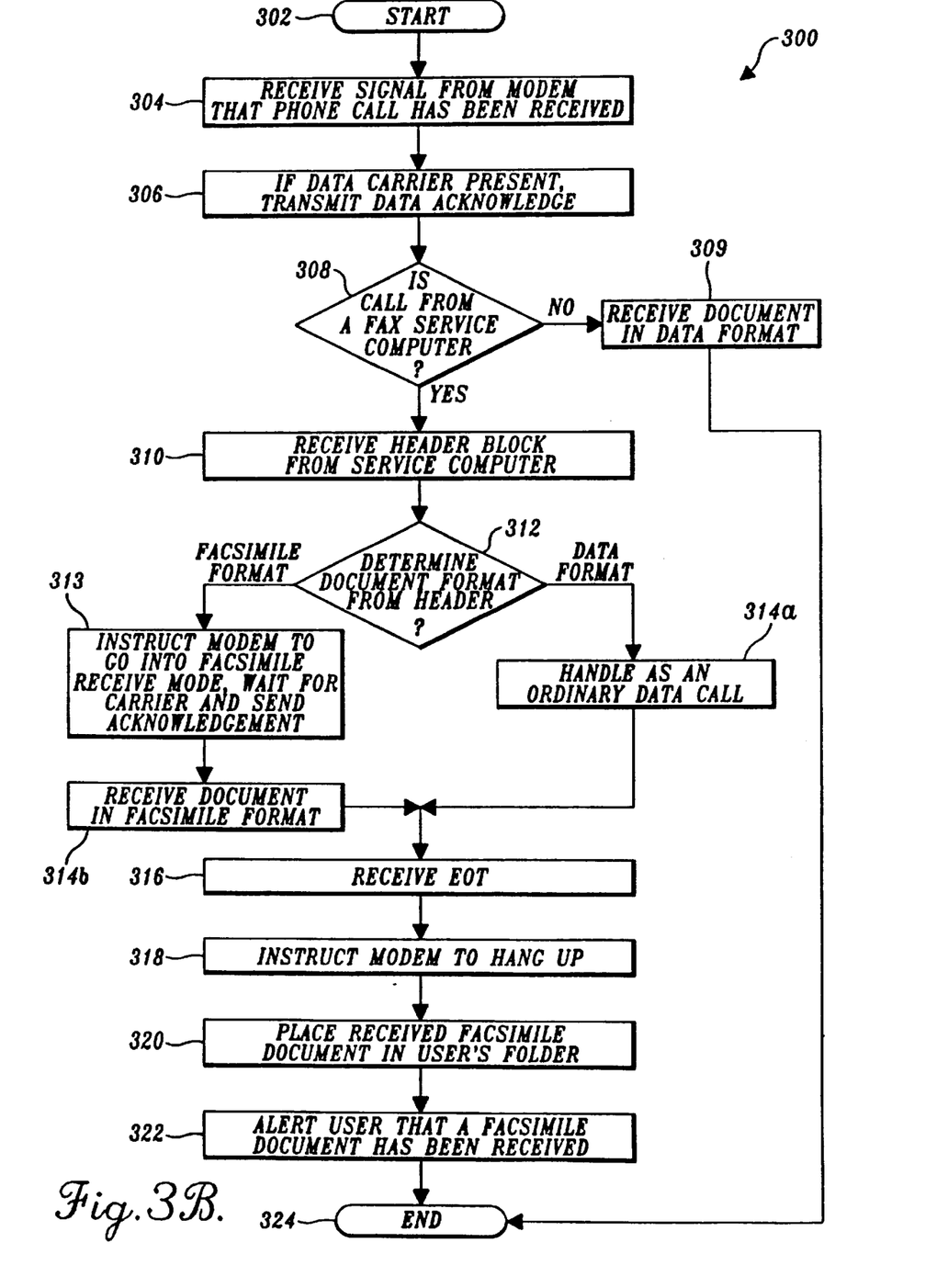
FIG. 3B is a flow chart showing a series of steps performed by a computer program that allows a central server computer to receive facsimile transmissions from the service computer according to the second aspect of the present invention.

As described above, in the second embodiment of the present invention, the service computer is programmed to send any received facsimile documents to the central server computer upon receipt. FIG. 3B is a flow chart showing the steps of a computer program 300 that is executed by the central server computer to receive and store the facsimile documents transmitted from the service computer according to the second embodiment of the present invention. The program 300 begins at a step 302 and proceeds to a step 304 when the central server computer receives a signal from the facsimile-compatible modem 30 indicating that a telephone call has been received. Next, the server computer instructs the modem to transmit an acknowledge signal if a data carrier is detected in a step 306. Then the server computer determines if the call is from a facsimile store-and-forward service computer in a step 308. In the preferred embodiment of this invention, this is accomplished by having the server computer read a code sent by the service computer over the data channel established in step 306 and return a second acknowledgment to signify that this code has been received and that the server computer is ready to receive a header block. If the call is not from a facsimile store-and-forward service computer, the modem 30 receives the document according to the standard operating procedure of the modem at a step 309 before the program 300 ends at a step 324.

Assuming the call is from a facsimile store-and-forward service computer, the header block is then received in a step 310. Next, the header block is read to determine whether the subsequent document will be in a data or a facsimile format. As this is determined in a step 312, other information in the header block may be read or stored for later use. If the header block specifies a data transmission, the server computer receives the document over the already established data channel in a step 314*a*. If the header block specifies a facsimile format, the server computer instructs its modem to go into facsimile receive mode, waits for a facsimile carrier signal, and sends an acknowledgment when the carrier signal is received in a step 313. Following step 313, the server computer receives the document via its facsimile-compatible modem 30 in facsimile format in a step 314*b*. The modem 30 next receives an end-of-transmission (EOT) signal from the service computer and passes it to the server computer's CPU in a step 316.

After receiving the EOT signal, the central server computer then instructs the facsimile-compatible modem 30 to hang up at a step 318. As described above, the header block received in step 310 contained a code identifying the intended recipient. Therefore, by reading the header block data, the central server computer can determine where to store the received document. The central server computer places the received facsimile document in a folder 28 that is associated with the intended recipient in a step 320. Finally, the central server computer alerts the recipient that a facsimile document has been received by transmitting an electronic message over the computer network in a step 322 before the program ends at a step 324.

As can be seen, the present invention is a method of receiving facsimile documents on a networked computer system in a way that maintains the confidentiality of the received documents. The present invention is compatible with current facsimile machines and facsimile store-and-forward services. Also, the present invention does not require the sender of the facsimile to alter the document in any way in order to route the document to its intended recipient. Nor does the present invention require any additional hardware than is currently used to send and receive facsimile documents to and from a networked computer system.

While the preferred embodiment of the invention has been illustrated and described, it will be appreciated that various changes can be made therein without departing from the spirit and scope of the invention. For example, although the present invention is designed to work with U S WEST's FAXMAIL™ system, by changing the particular codes transmitted the present invention could be made to work with other facsimile store-and-forward systems. Therefore, it is intended that the scope of the invention be determined solely by the following claims.

The embodiments of the invention in which an exclusive property or privilege is claimed are defined as follows:

1. A system for distributing facsimiles to each of a plurality of users comprising:

a service computer having a service modem, the service computer operative to
   (a) store each facsimile addressed to at least one of the users,
   (b) receive a call requesting facsimiles addressed to one of the users,
   (c) retrieve stored facsimiles addressed to the user, and
   (d) send each retrieved facsimile using the service modem;

a plurality of user computers interconnected by a computer network, each computer accessible by at least one user; and a server in communication with each user computer through the computer network, the server further in communication with a server modem operative to receive facsimiles, the server operative to
   (a) call the service computer requesting facsimiles addressed to at least one user,
   (b) receive each retrieved facsimile using the server modem, and
   (c) alert the at least one user of any retrieved facsimile through the computer network.

2. A system for distributing facsimiles as in claim 1 further comprising a memory unit, the memory unit containing a plurality of folders, one folder for each user, the server further operative to store each received facsimile in the folder for each of the at least one user.

3. A system for distributing facsimiles as in claim 1 wherein the service computer has a separate telephone number for each user, the server operative to call the telephone number corresponding to the user for whom facsimiles are requested.

4. A system for distributing facsimiles as in claim 1 wherein the server is further operative to call the service computer, receive each retrieved facsimile, and alert each of the plurality of users.

5. A system for distributing facsimiles as in claim 1 wherein the server is further operative to periodically request facsimiles for each of the plurality of users.

6. A system for distributing facsimiles to each of a plurality of users comprising:

a service computer having a service modem, the service computer operative to
   (a) store each facsimile addressed to at least one of the users, (b) retrieve stored facsimiles addressed to one of the users, (c) insert a code identifying the user in a header block for each retrieved facsimile, and (d) send each retrieved facsimile using the service modem;

a plurality of user computers interconnected by a computer network, each computer accessible by at least one user; and a server in communication with each user computer through the computer network, the server further in communication with a server modem operative to receive facsimiles, the server operative to (a) receive each retrieved facsimile using the server modem, (b) determine the addressed user based on the inserted code, and (c) alert the user of any retrieved facsimile through the computer network.

7. A system for distributing facsimiles as in claim 6 further comprising a memory unit, the memory unit containing a plurality of folders, one folder for each user, the server further operative to store each received facsimile in the folder for the addressed user.

8. A system for distributing facsimiles as in claim 6 wherein the service computer is further operative to receive facsimiles at one of a plurality of telephone numbers, each telephone number unique to one user.

9. A system for distributing facsimiles as in claim 6 wherein stored facsimiles addressed to one of the users are retrieved by the service computer only if a user profile within the service profile includes a telephone number for the server modem.

10. A method for automatically distributing facsimiles to each of a plurality of users, each user accessing at least one user computer in a computer network, the method comprising:

providing a facsimile store-and-forward computer not part of the computer network with a list of the plurality of users;

storing a fax addressed to at least one user in the store-and-forward computer;

receiving a call from a server in communication with the computer network to retrieve facsimiles addressed to one of the users;

faxing each facsimile addressed to the user from the store-and-forward computer to the server; and alerting the user through the computer network of any facsimiles faxed to the server.

11. A method for distributing facsimiles as in claim 10 further comprising saving each facsimile addressed to the user in a user personal folder.

12. A method for distributing facsimiles as in claim 10 further comprising providing the store-and-forward computer with a unique telephone number for each user, the call received from the server sent to the telephone number assigned to the user.

13. A method for distributing facsimiles as in claim 10 further comprising receiving a call from a server, faxing each facsimile, and alerting the user for each user.

14. A method for distributing facsimiles as in claim 10 further comprising periodically receiving a call from the server for each of the plurality of users.

15. A method for automatically distributing facsimiles to each of a plurality of users, each user accessing at least one user computer in a computer network, the method comprising:

providing a facsimile store-and-forward computer not part of the computer network with a list of the plurality of users;

storing a facsimile addressed to at least one user in the store-and-forward computer;

retrieving each stored facsimile addressed to one of the users;

inserting a code identifying the user in a header block for each retrieved facsimile;

faxing each facsimile with the inserted code from the store-and-forward computer to a server in communication with the computer network; and alerting the user through the computer network of any facsimiles faxed to the server.

16. A method for distributing facsimiles as in claim 15 further comprising saving each facsimile in a personal folder corresponding to the addressed user.

17. A method for distributing facsimiles as in claim 15 further comprising providing the store-and-forward computer with a plurality of telephone numbers, each telephone number unique to one user.

18. A method for distributing facsimiles as in claim 15 further comprising periodically retrieving each stored facsimile addressed to one of the users.

* * * * *